(12) United States Patent
Shinde

(10) Patent No.: US 6,272,326 B1
(45) Date of Patent: Aug. 7, 2001

(54) DISTORTION COMPENSATION ADDRESS GENERATOR, DISTORTION COMPENSATING CIRCUIT, AND TRANSMITTER

(75) Inventor: Hiroki Shinde, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/351,170

(22) Filed: Jul. 12, 1999

(30) Foreign Application Priority Data

Jul. 13, 1998 (JP) .................................................. 10-197719

(51) Int. Cl.⁷ .................................................. H01Q 11/12
(52) U.S. Cl. .......................... 455/127; 455/91; 455/522; 330/149; 375/296; 375/297
(58) Field of Search ..................................... 455/114, 127, 455/126, 311, 341, 63, 522, 91; 330/2, 149; 375/296, 297, 284, 285

(56) References Cited

U.S. PATENT DOCUMENTS

| 5,638,024 | * | 6/1997 | Dent et al. ........................... 330/84 |
| 5,903,611 | * | 5/1999 | Schnabl et al. ..................... 375/297 |
| 5,905,760 | * | 5/1999 | Schnabl et al. ..................... 375/296 |
| 5,923,712 | * | 7/1999 | Leyendecker et al. .............. 455/126 |
| 5,949,283 | * | 9/1999 | Proctor et al. ....................... 330/149 |
| 6,072,364 | * | 6/2000 | Jeckeln et al. ....................... 330/149 |
| 6,081,158 | * | 6/2000 | Twitchell et al. .................... 375/297 |
| 6,141,390 | * | 10/2000 | Cova .................................... 375/297 |

FOREIGN PATENT DOCUMENTS 9-74371  3/1997 (JP) .

OTHER PUBLICATIONS

An English Language abstract of JP 9–74371.

* cited by examiner

Primary Examiner—Nay Maung
Assistant Examiner—Sonny Trinh
(74) Attorney, Agent, or Firm—Greenblum & Bernstein, P.L.C.

(57) ABSTRACT

An address generator for compensating non-linear distortion of a transmitting amplifier according to this invention comprises transmission power calculation means for calculating transmission power based on transmission data, a comparator control circuit, and an address generation table. The address generation table comprises a plurality of comparators operating in parallel. The comparator control circuit turns on only necessary comparators based on the transmission power value so as to reduce power consumption.

22 Claims, 15 Drawing Sheets

FIG.5(a)

| | TRANSMISSION POWER VALUE CALCULATION RESULT | | | | | | | |
|---|---|---|---|---|---|---|---|---|
| | 0 | 1 | 2 | 3 | 4 | 5 | 6 | 7 |
| COMPARISON VALUE #0 | ON | ON | ON | ON | ON | ON | ON | ON |
| COMPARISON VALUE #1 | OFF | ON | ON | ON | ON | ON | ON | ON |
| COMPARISON VALUE #2 | OFF | OFF | ON | ON | ON | ON | ON | ON |
| COMPARISON VALUE #3 | OFF | OFF | ON | ON | ON | ON | ON | ON |
| COMPARISON VALUE #4 | OFF | OFF | OFF | ON | ON | ON | ON | ON |
| COMPARISON VALUE #5 | OFF | OFF | OFF | ON | ON | ON | ON | ON |
| COMPARISON VALUE #6 | OFF | OFF | OFF | ON | ON | ON | ON | ON |
| COMPARISON VALUE #7 | OFF | OFF | OFF | ON | ON | ON | ON | ON |

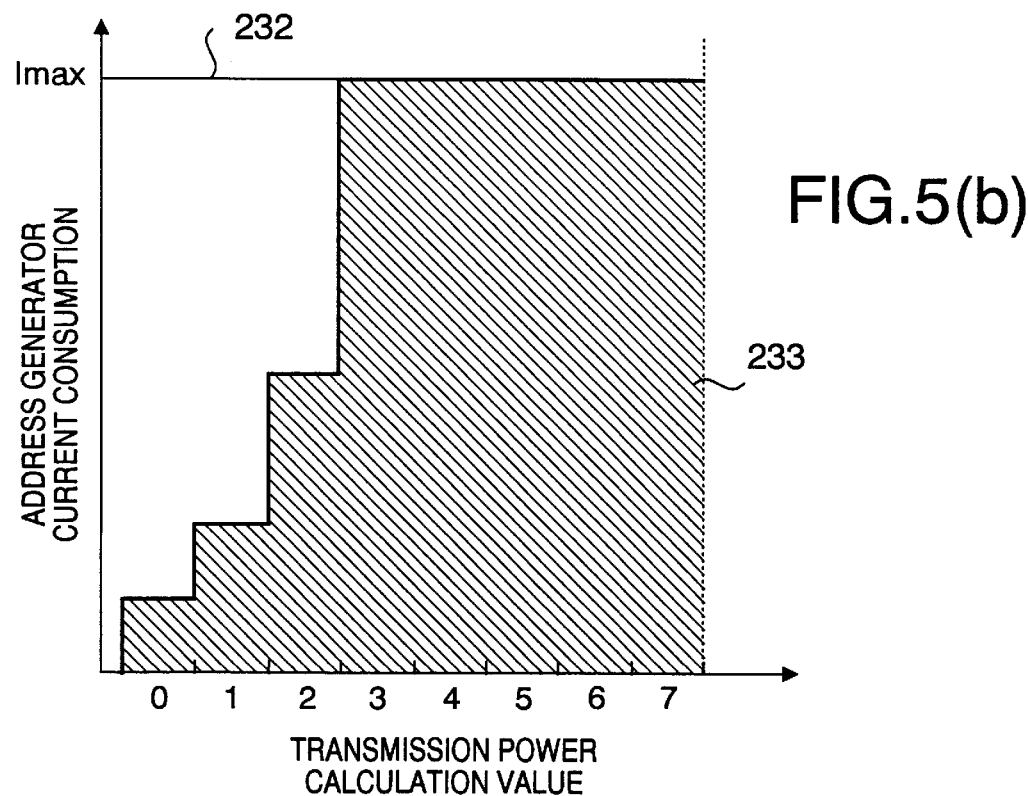

FIG.5(b)

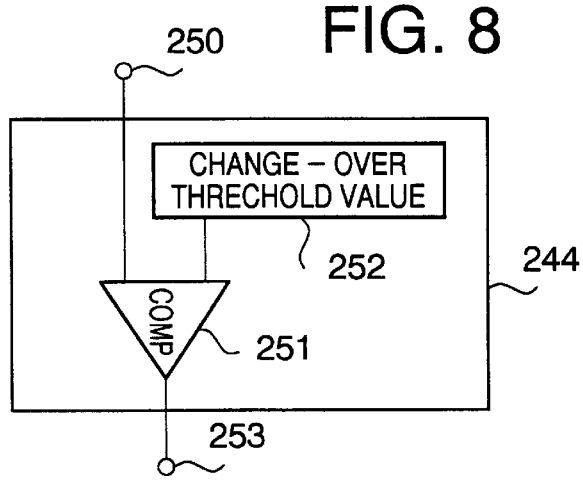
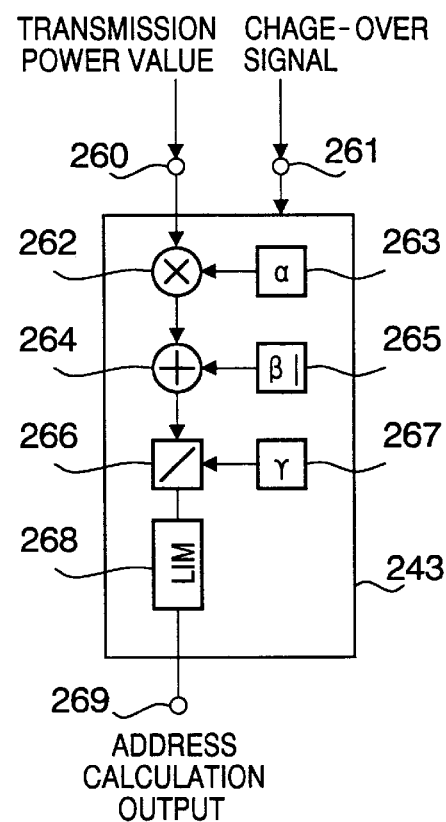
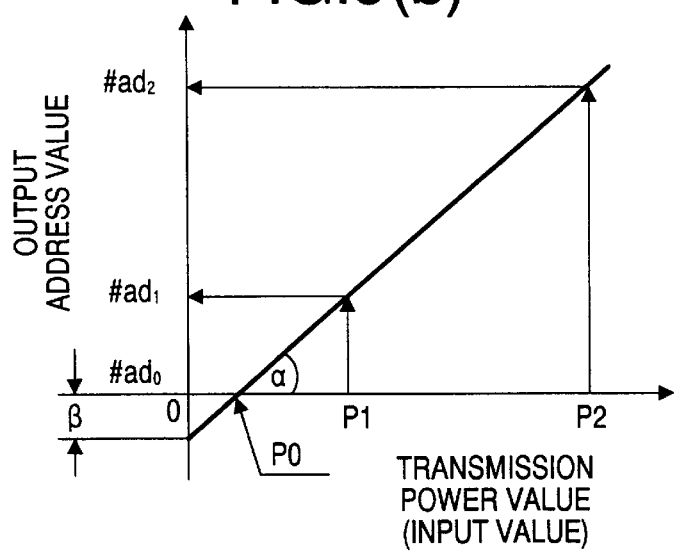

FIG.10(a)

| ADDRESS GENERATION SOURCE | | TRANSMISSION POWER VALUE CALCULATION RESULT | | | | | | | |
|---|---|---|---|---|---|---|---|---|---|
| | | 0 | 1 | 2 | 3 | 4 | 5 | 6 | 7 |
| ADDRESS GENERATION TABLE | COMPARISON VALUE #0 | ON | ON | ON | OFF | OFF | OFF | OFF | OFF |
| | COMPARISON VALUE #1 | OFF | ON | ON | OFF | OFF | OFF | OFF | OFF |
| | COMPARISON VALUE #2 | OFF | OFF | ON | OFF | OFF | OFF | OFF | OFF |
| | COMPARISON VALUE #3 | OFF | OFF | ON | OFF | OFF | OFF | OFF | OFF |
| | COMPARISON VALUE #4 | OFF | OFF | OFF | OFF | OFF | OFF | OFF | OFF |
| | COMPARISON VALUE #5 | OFF | OFF | OFF | OFF | OFF | OFF | OFF | OFF |
| | COMPARISON VALUE #6 | OFF | OFF | OFF | OFF | OFF | OFF | OFF | OFF |
| | COMPARISON VALUE #7 | OFF | OFF | OFF | OFF | OFF | OFF | OFF | OFF |
| ADDRESS CALCULATOR | | OFF | OFF | OFF | ON | ON | ON | ON | ON |

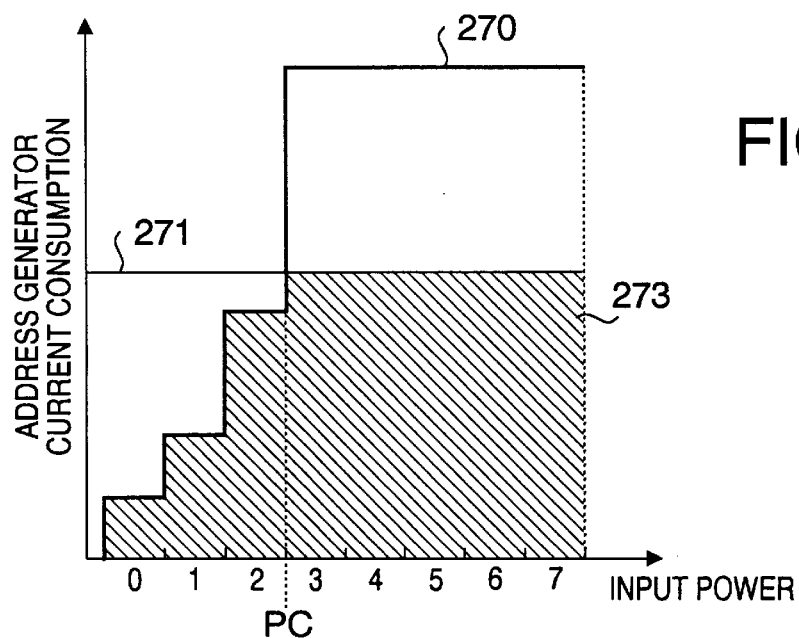

FIG.10(b)

DISTORTION COMPENSATION ADDRESS GENERATOR, DISTORTION COMPENSATING CIRCUIT, AND TRANSMITTER

BACKGROUND OF THE INVENTION

1. Field of the Invention

The present invention relates to a distortion compensation address generator, a distortion compensating circuit, and a transmitter.

2. Description of the Related Art

In communication apparatuses such as a cellular phone, etc., as shown in FIG. 17(a), a signal is radio transmitted from an antenna 503 through amplification due to an IF amplifier 501 and a transmitting amplifier 502. As an I/O (input/output) characteristic of the transmitting amplifier 502, it is ideal that a good linearity as shown in a dot-dash line of FIG. 17(b) is ensured. However, in actual, as shown in a solid line of FIG. 17(b), an amplification factor is reduced as input signal voltage increases higher because of a characteristic of a semiconductor element forming the transmitting amplifier 502, with the result that a non-linear distortion occurs. This distortion causes deterioration of communication quality.

For this reason, in order to compensate for the non-linear distortion of the transmitting amplifier, there is provided a circuit (distortion compensating circuit) 500 for compensating for the distortion at a digital data stage as shown in FIG. 17(a).

The distortion compensating circuit 500 compensates for transmitting data using compensation data having a characteristic opposite to the actual I/O characteristic of the transmitting amplifier (characteristic shown in the solid line of FIG. 17(b)), so that the linearity of transmitting amplifier 502 is improved.

Since the value of transmitting data varies instantaneously in real time, the compensation of the non-linear distortion of the transmitting amplifier must be performed to follow the variation at high speed.

Also, in mobile communication, transmission power control is carried out for the purpose of reducing co-channel interference and power consumption of the mobile apparatus. If a gain of the transmitting amplifier is adjusted by the transmission power control, the compensation for the non-linear distortion must be carried out to follow the adjustment appropriately.

In FIG. 17(a), the reason why a transmission power control signal is input to not only the transmitting amplifier 502 but also the compensating circuit 500 is that the distortion compensation must be carried out in accordance with transmission power.

As a useful system, which realizes a high speed distortion compensation, there is a system in which distortion compensation data is stored in a memory and an memory address is generated at high speed by address tables and distortion compensation data is output from the memory, that is, a memory access system using the address tables.

However, in the memory access system using the address tables, numerous comparators, which are operated in parallel, are required, and these comparators must be operated at high speed to follow the change in transmitting data, with the result that there is difficulty in downsizing the communication apparatus and obtaining low power consumption.

Also, for compensating for the non-linear distortion of the transmitting amplifier in mobile communication, particularly a cellular phone, transmission power of the transmitting amplifier varies over several tens of gradations (levels) by transmission power control. Therefore, the number of address generation tables corresponding to the number of gradations must be prepared. Moreover, in order to perform high-speed distortion compensation, it is necessary to operate the plurality of address generation tables. Therefore, in view of this point, there is difficulty in downsizing the communication apparatus and obtaining low power consumption.

The present invention has been made in consideration of the above-mentioned problems, and an object of the present invention is to realize miniaturization of the circuit and low power consumption as ensuring high-speed distortion compensation of the transmitting amplifier.

SUMMARY OF THE INVENTION

A distortion compensation address generator of the present invention in one preferred mode includes a plurality of comparators each for comparing a transmission power value with a respective predetermined reference value, a decoder for decoding an output of each of the plurality of comparators, and comparator control means for turning off a part of the plurality of comparators being not used in generation of the address, corresponding to a level of the transmission power value.

In accordance with the level of the transmission power value, only a part of numerous comparators built in an address generation table is operated and the other comparators are turned off, so that power consumption in the circuit can be restrained.

Also, according to one preferred mode of the present invention, comparator control means compares the transmission power value with an operation area coefficient prepared in advance so as to generate a control signal for turning off the part of the comparators.

The comparison between the coefficient (operation area coefficient) prepared in advance and the transmission power value makes it possible to determine a comparator to be turned off in real time.

According to the other preferred mode of the present invention, the distortion compensation address generator of the present invention further comprises transmission power calculation means for calculating the transmission power value based on transmitting data.

This makes it possible to calculate a necessary transmission power value instantaneously.

Moreover, according to the other preferred mode of the present invention, transmission power calculation means combines a plurality of transmitting signals to calculate transmission power.

Since transmission power can be calculated by combining the plurality of signals, the address generator of the present invention can be used in not only a mobile apparatus for a cellular phone but also a base station apparatus.

According to the other preferred mode of the present invention, there is provided a distortion compensation address generator includes, an address generation table having a plurality of comparators each for comparing a transmission power value with a respective predetermined reference value, a decoder for decoding an output of each of the plurality of comparators, and comparator control means for turning off a part of the plurality of comparators being not used in generation of the address in accordance with a level of the transmission power value, an address calculator for providing a predetermined calculation to the transmission power value so as to generate the address, and a switching circuit for comparing the transmission power value with a predetermined threshold value to turn on either the address generation table or the address calculator, corresponding to a comparison result. Since the number of comparators are increased as the transmission power value is increased, current consumption in the address generation table is increased when the transmission power value becomes great. On the other hand, in an address calculator for generating an address in real time after executing a predetermined calculation, operating current is substantially determined by an amount of hardware. For this reason, current consumption is substantially constant regardless of the transmission power value. Therefore, both are complementarily combined and used under a predetermined condition, thereby making it possible to restrain an amount of current consumption in the entire address generator most effectively.

Also, according to the other preferred mode of the present invention, the switching circuit turns on the address generation table when the transmission power is lower than a threshold value and turns on the address calculator when the transmission power is higher than the threshold value.

In an address generation table with a comparator-off function, as the input power value is smaller, the effect of reduction in current consumption is brought to the fore. For this reason, the address generation table is used in an area where the input power value is smaller than the threshold value. Then, when the input power value exceeds the threshold value, the address calculator is used so as to restrain current consumption to be substantially constant regardless of an increase in the input power value. Thus, a synergistic effect therebetween makes it possible to restrain power consumption required in the address generation to a minimum. Also, the address generation table is not needed in an area where the input power value is great. For this reason, the number of comparators and that of decoders can be largely reduced, thereby achieving miniaturization of the apparatus.

Furthermore, according to the other preferred mode of the present invention, the address calculator has a function of executing an addition, a multiplication, and a division.

Since the address is generated by a linear calculation, the structure of the address calculator can be simplified.

Also, according to the other embodiment of the present invention, the address calculator performs the division by a bit shift operation. Since the division is performed by the bit shift operation, a divider can be basically formed by a shift register. Therefore, the structure of the address calculator can be further simplified.

Further, according to the other preferred mode of the present invention, the distortion compensation address generator of the present invention further comprises transmission power calculation means for calculating the transmission power value based on transmitting data.

This makes it possible to calculate a necessary transmission power value instantaneously.

Also, according to the other preferred mode of the present invention, transmission power calculation means combines a plurality of transmitting signals to calculate transmission power. Since transmission power can be calculated by combining the plurality of signals, the address generator of the present invention can be used in not only a mobile apparatus for a cellular phone but also a base station apparatus.

Moreover, according to the other preferred mode of the present invention, there is provided a distortion compensation address generator includes, transmission power calculation means for calculating transmission power of a transmitting signal, a plurality of address generation tables selectively switched when a transmission power value calculated by the transmission power calculation means is inputted, an address calculator having a plurality of calculation coefficient tables and executing a predetermined calculation with respect to the transmission power value of the transmitting signal by use of coefficient values of one pair of the calculation coefficient tables selected from the plurality of calculation coefficient tables, thereby allowing the address to be generated, table selecting means for selecting one address generation table from the plurality of address generation tables and one pair of calculation coefficient tables from the plurality of calculation coefficient tables in accordance with a transmission power level of the transmitting amplifier, and a switching circuit for comparing the transmission power value with a predetermined threshold value to turn on either the address generation table or the address calculator in accordance with a comparison result, wherein each of the plurality of address generation table has a plurality of comparators for comparing the transmission power value with a predetermined reference value; a decoder for decoding an output of each of the plurality of comparators, and comparator control means for turning off a part of the plurality of comparators uncontributing to generation of the address in accordance with a level of the transmission power value.

A plurality of address generation tables is prepared in response to transmission power control of the transmitting amplifier. Also, in a case where a plurality of pairs of calculation coefficient tables is built in the address calculator, only the table to be actually used is turned on in accordance with the level of transmission power and the other tables are turned off, thereby making it possible to largely reduce power consumption. After thus selecting the table to be used, the comparators unnecessary for the address generation table are turned off, and a change to the address calculator in a high transmission power area is carried out. As a result, power consumption necessary for the address generation can be further reduced, and the miniaturization of the apparatus can be achieved.

Moreover, according to the other preferred mode of the present invention, transmission power calculation means combines a plurality of transmitting signals to calculate transmission power. Since transmission power can be calculated by combining the plurality of signals, the address generator of the present invention can be used in not only a mobile apparatus for a cellular phone but also a base station apparatus.

Also, according to the other embodiment of the present invention, the switching circuit turns on the address generation table when the transmission power is smaller than the-threshold value and turns on the address calculator when the transmission power is larger than the threshold value.

In an address generation table with a comparator-off function, as the input power value is smaller, the effect of reduction in current consumption is brought to the fore. For this reason, the address generation table is used in an area where the input power value is smaller than the threshold value. Then, when the input power value exceeds the threshold value, the address calculator is used so as to restrain current consumption to be substantially constant regardless of an increase in the input power value. Thus, a synergistic effect therebetween makes it possible to restrain power consumption required in the address generation to a minimum. Also, the address generation table is not needed in an area where the input power value is large. For this reason, the number of comparators and that of decoders can be largely reduced, thereby achieving miniaturization of the apparatus.

Furthermore, according to the other preferred mode of the present invention, the address calculator has a function of executing an addition, a multiplication, and a division. Since the address is generated by a linear calculation, the structure of the address calculator can be simplified.

Also, according to the other preferred mode of the present invention, the address calculator performs the division by a bit shift operation. Since the division is performed by the bit shift operation, a divider can be basically formed by a shift register. Therefore, the structure of the address calculator can be further simplified.

According to one preferred mode of the transmitter of the present invention, there is provided a transmitter includes,
- a distortion compensation address generator of the present invention,
- distortion compensation data storing means for inputting an address signal output from the distortion compensation address generator so as to output corresponding distortion compensation data, and
- a compensating circuit for compensating for distortion of a transmitting signal using the distortion compensation data output from the distortion compensation data storing means so as to carry out non-linear distortion compensation of a transmitting amplifier.

Thereby, it is possible to carry out compensation for non-linear distortion of the transmitting amplifier to follow an instantaneous variation of transmission power and a variation of a control value of transmission power control based on transmitting data. Also, a distortion compensation circuit having features of lower power consumption and the small size can be realized.

Also, according to the other preferred mode of the transmitter of the present invention, there is provided a transmitter includes,
- a spread processing section for performing spectrum spread by multiplying data to be transmitted by a specific code,
- a distortion compensation address generator described in any one of claims 1 to 15,
- distortion compensation data storing means for inputting an address signal output from the distortion compensation address generator so as to output corresponding distortion compensation data,
- a compensating circuit for compensating for distortion of data passed through the spread processing section using the distortion compensation data output from the distortion compensation data storing means so as to carry out non-linear distortion compensation of a transmitting amplifier,
- a transmitting amplifier for amplifying a transmitting signal obtained based on data output from the compensating circuit, and
- an antenna for outputting an output of the transmitting amplifier as a radio signal.

Thereby, communication quality in a transmitter (cellular phone, etc.) of a CDMA system can be improved.

Further, according to the other embodiment of the transmitter of the present invention, there is provided a transmitter includes,
- a time division multiplex processing section for performing time-division multiplex processing,
- a distortion compensation address generator having a plurality of comparators for comparing a transmission power value with a predetermined reference value, a decoder for decoding an output of each of the plurality of comparators; and comparator control means for turning off a part of the plurality of comparators uncontributing to generation of the address in accordance with a level of the transmission power value,
- distortion compensation data storing means for inputting an address signal output from the distortion compensation address generator so as to output corresponding distortion compensation data,
- a compensating circuit for a compensating circuit for compensating for distortion of data passed through the time division multiplex processing section using the distortion compensation data output from the distortion compensation data storing means so as to carry out non-linear distortion compensation of a transmitting amplifier,
- a transmitting amplifier for amplifying a transmitting signal obtained based on data output from the compensating circuit, and
- an antenna for outputting an output of the transmitting amplifier as a radio signal.

Thereby, communication quality in a transmitter (cellular phone, etc.) of a CDMA system can be improved.

Also, according to the other embodiment of the transmitter of the present invention, the transmitter further comprises transmission power designating means for designating transmission power with respect to the transmitting amplifier and the distortion compensation address generator. This makes it possible to realize a transmitter in which reduction in power consumption due to control of transmission power can be attained and communication with high quality can be carried out. Moreover, the transmitter of the present invention is mounted on a mobile station apparatus or a base station apparatus, thereby realizing an apparatus in which communication with high quality can be carried out and low power consumption and miniaturization can be attained.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 5(a) is a view showing the relationship between input power and ON/OFF of the comparator in the distortion compensation address generation table according to the first embodiment;

FIG. 5(b) is a view showing a specific example of current consumption characteristics in the distortion compensation address generation table according to the first embodiment;

FIG. 8 is a circuit diagram showing the structure of an address generation switching device according to he second embodiment;

FIG. 9(a) is a circuit diagram showing the specific structure of an address calculator according to the second embodiment;

FIG. 9(b) is a view showing the relationship between a transmission power value and an output address value in the address calculator according to the second embodiment;

FIG. 9(c) is a view showing a condition in the address calculator according to the second embodiment;

FIG. 10(a) is a view showing the relationship between input power and ON/OFF of the comparator in the distortion compensation address generation table according to the second embodiment;

FIG. 10(b) is a view showing a specific example of current consumption characteristics in the distortion compensation address generation table according to the second embodiment;

DETAILED DESCRIPTION OF THE PREFERRED EMBODIMENTS

Embodiments of the present invention will now be described with reference to the accompanying drawings.

First Embodiment

Figure 1:
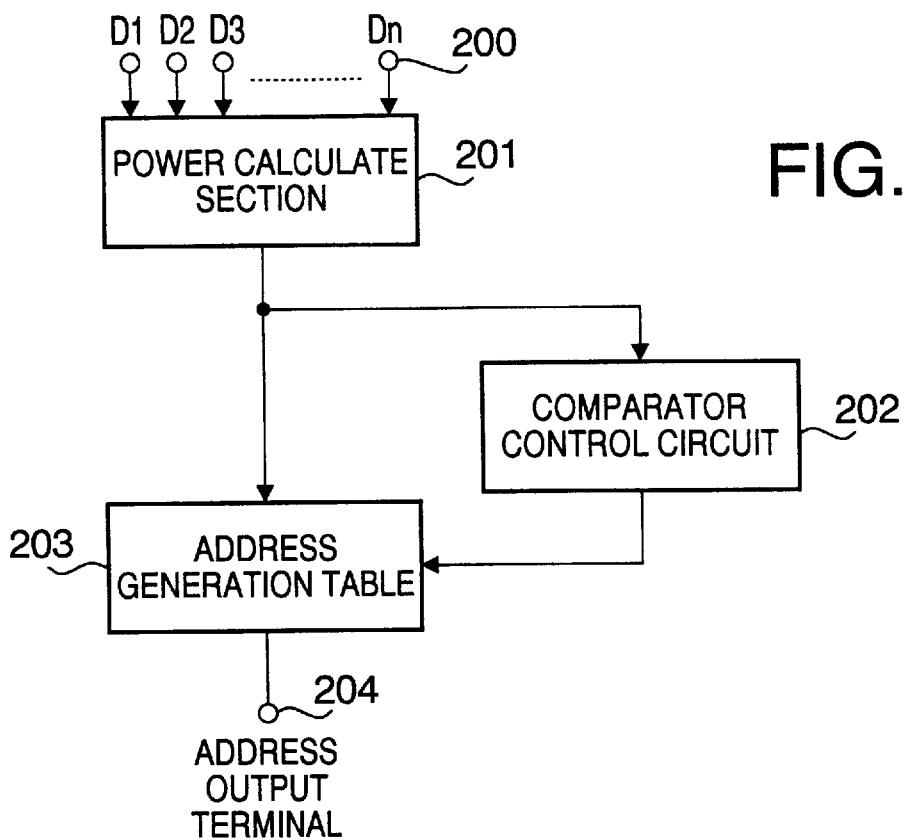
FIG. 1 is a block diagram showing the structure of a distortion compensation address generation table according to a first embodiment of the present invention.

FIG. 1 is a circuit diagram showing the basic structure of a distortion compensation address generator according to this embodiment.

The feature of this embodiment lies in that a part of numerous comparators built in an address generation table is turner off in accordance with a transmission power calculation value so as to reduce power consumption.

As shown in FIG. 1, the address generator comprises an input terminal 200 for transmission data. a power calculate section 201, a comparator control circuit 202, and an address generation table 203.

When a plurality of transmission data 1 to n are inputted from the input terminal 200, the power calculate section 201 calculates a transmission power value. The calculation value of transmission power is one that is obtained by squaring each of input transmission data 1 to n and adding all resultant values or providing square root processing to the value of the addition.

The comparator control circuit 202 determines a comparator to be operated based on the transmission power value, which is the calculation result of the power calculate section 201, and outputs a signal (comparator control signal), which is used to turn off an unnecessary comparator, to the address generation table 203.

The address generation table 203 has numerous comparators, which are operable in parallel, built therein, and only necessary comparators are operated upon reception of the comparator control signal from the comparator control circuit 202. Then, the address generation table 203 performs operations such as comparison, decode, etc., using the transmission power value output from the power calculate section 201 as an input so as to generate an address for compensating distortion. The address for compensating distortion is output from an address output terminal 204.

Figure 15:
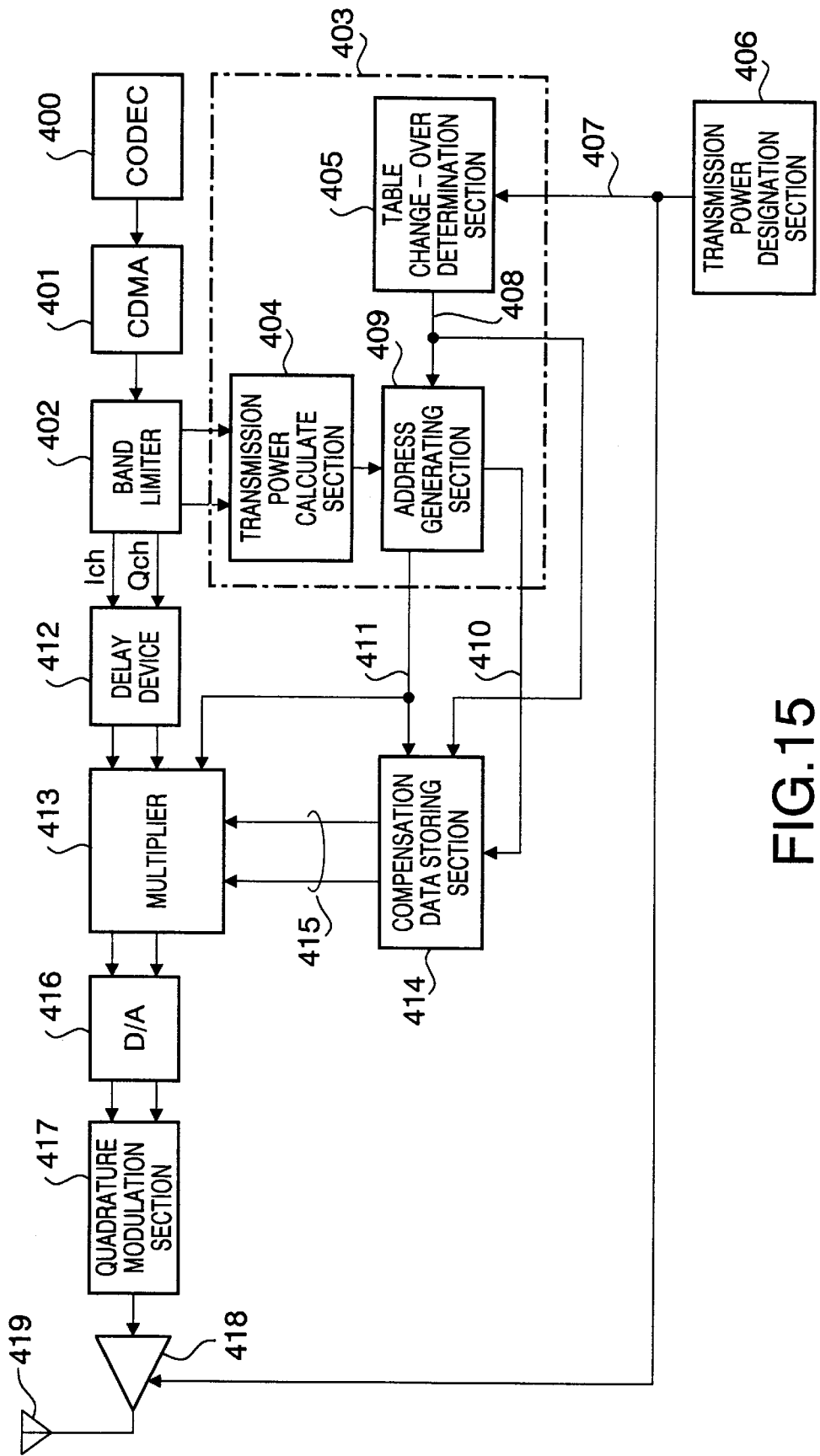
FIG. 15 is a block diagram showing the structure of a transmitter of a CDMA system according to a sixth embodiment of the present invention.

By the address for compensating distortion, for example, an address of a compensation data storing section 414 of FIG. 15 is designated, and non-linear distortion compensation data is output. Then, a compensation data multiply section 413 multiplies output data by transmission data, thereby obtaining corrected transmitting data. The entire system will be described later.

Figure 2:
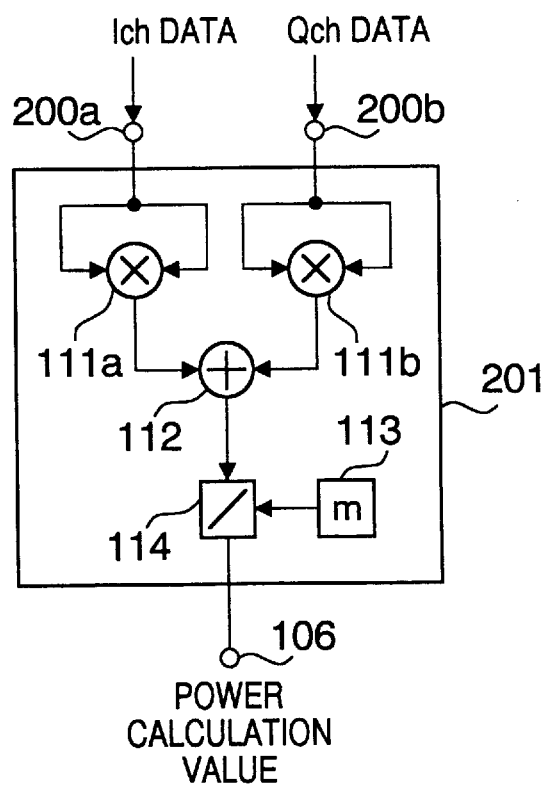
FIG. 2 is a circuit diagram showing a specific structure of a power calculate section according to the first embodiment.

Next, a specific structure of each part shown in FIG. 1 will be explained. FIG. 2 is a view showing a specific structure when n of power calculate section 201=2.

In FIG. 2, transmitting signals of the respective channels Ich and Qch are input in parallel to the power calculate section 201. The input transmitting signals are squared by multipliers 111a and 111b, respectively, and added by an adder 112, respectively. Sequentially, these added signals are divided by a divider 114 using coefficient m of division stored in a register 113, and calculation results are output from a terminal 106.

Next, a specific example of each of comparator control circuit 202 and address generation table 203 will be explained with reference to FIG. 3.

Figure 3:
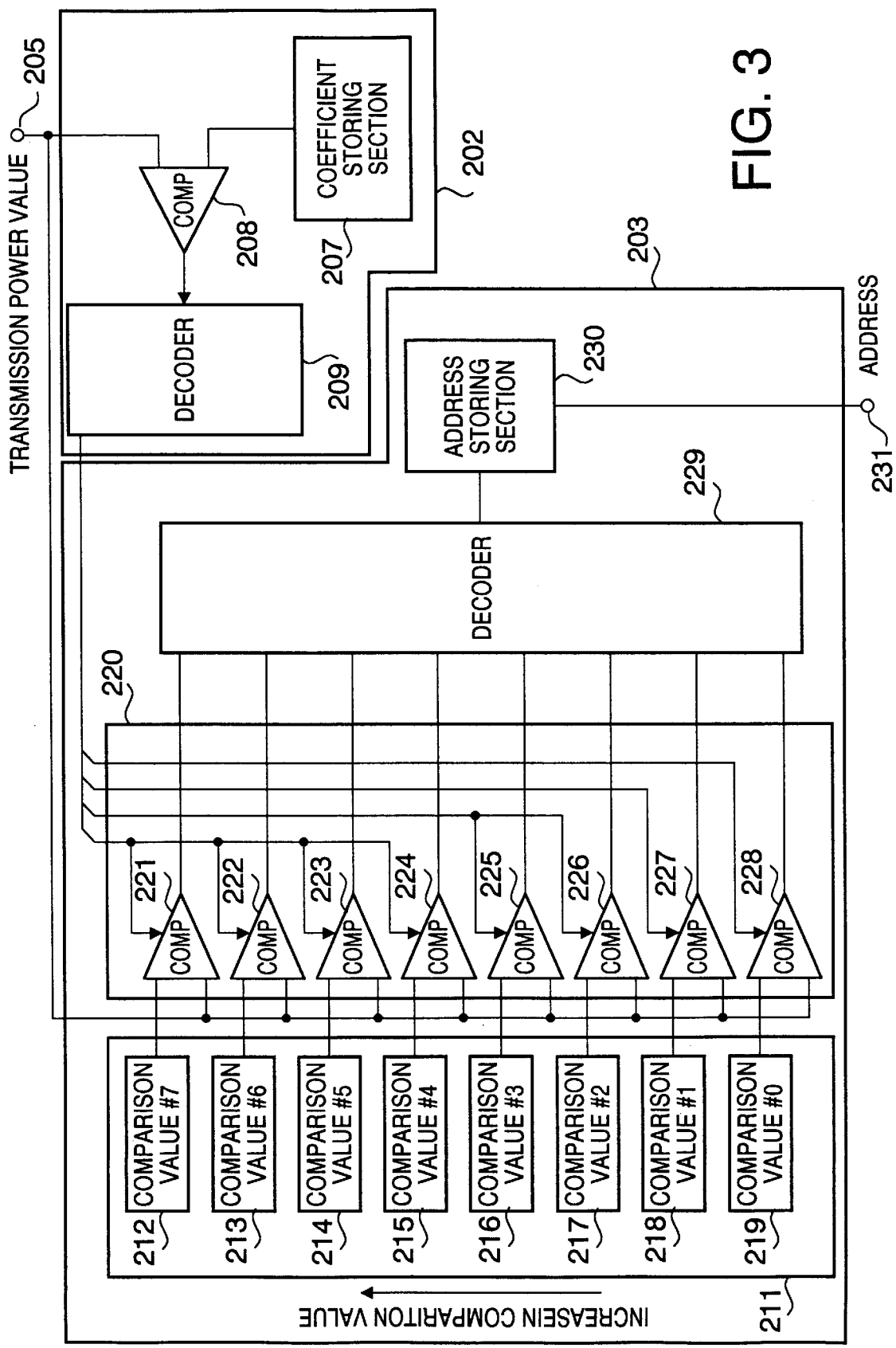
FIG. 3 is a circuit diagram showing a comparator control circuit-and a specific structure of the address generation table according to the first embodiment.

In FIG. 3, the transmission power value is input to a terminal 205 provided at the comparator control circuit 202. The terminal 205 is a signal input terminal for a comparator

208. In a coefficient storing section 207, a coefficient for selecting at least one comparator to be operated is stored. A decoder 209 generates control signals for comparators 221 to 228 of the address generation table 203 based on the comparison result of the comparator 208.

The address generation table 203 has a comparison value group 211 including comparison value storing sections 212 to 219, which store comparison values "#0 to #7", respectively. Also, output terminals of comparison value storing sections 212 to 219 are connected to a comparator group 220 including comparators 221 to 228, respectively.

The respective outputs of the comparator group 220 including comparators 221 to 228 are input to a decoder 229. The decoder 229 decodes input signals, and transmits the decoding result to an address storing section 230.

The address storing section 230 is a memory, which stores an address showing an area where distortion compensation data of a transmitting amplifier is stored. The address storing section 230 is accessed by an output signal of the decoder 229, and outputs the address, which shows the area where distortion compensation data is stored, through an address output terminal 231.

Figure 4:
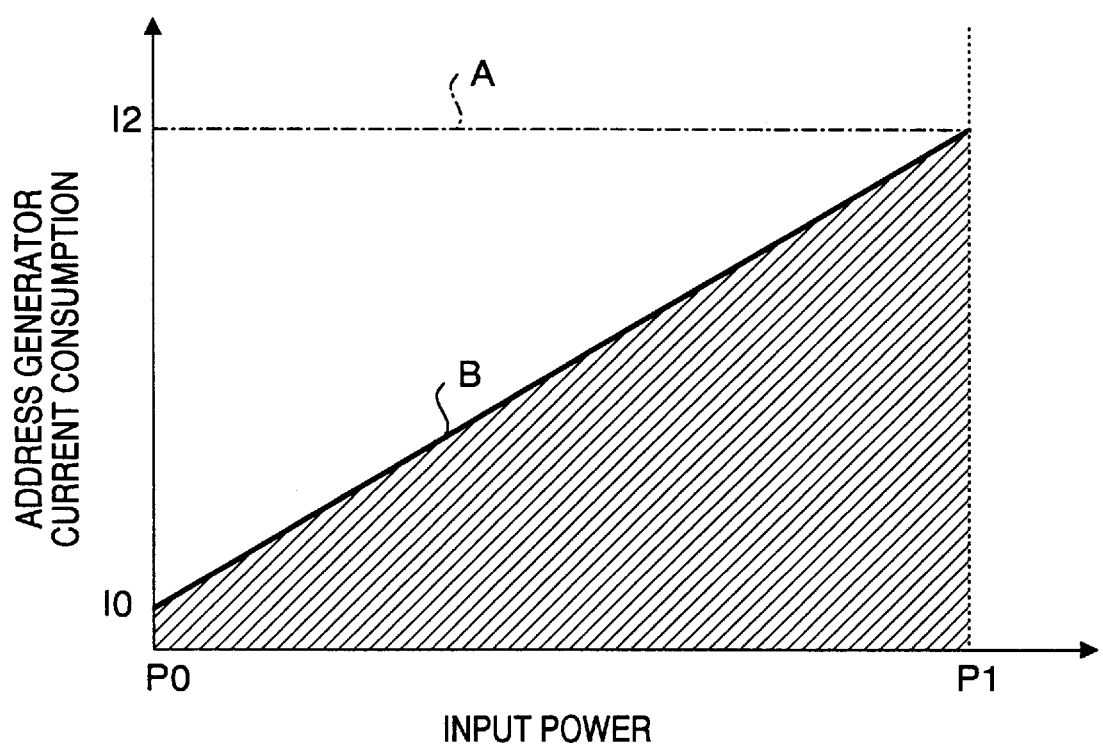
FIG. 4 is a view showing an outline of current consumption characteristics with respect to input power in the distortion compensation address generation table according to the first embodiment.

FIG. 4 shows an outline of the relationship between input power (transmission power calculation value) and current consumption of the address generator according to this embodiment.

In FIG. 4. a characteristic A shown in a dash-single-dot line indicates a case (comparison) in which all comparators built in the address generation table 203 are always turned on, and a characteristic B shown in a solid line thereof indicates a case in which unnecessary comparators which do not substantially contribute to the address generation by control of the comparator control circuit 202. In FIG. 4, it should be noted that the relationship of input power $p0<p1$ is established.

As is obvious from FIG. 4, in the case of the comparison, current consumption is constant regardless of input power, while in the case of this embodiment, the effect of reduction in current consumption becomes more pronounced as input power becomes small. In the case of communication apparatus such as a cellular phone, since normal transmission power is not so high, the effect in which power consumption can be reduced in the range of the highest frequency of the transmission power in use is high.

FIG. 5(*a*) and FIG. 5(*b*) are views explaining the result of the effect of reduction in current consumption has been specifically examined by a computer simulation.

On the assumption that eight levels of "0" to "7" would be set as a transmission power calculation value, FIG. 5(*a*) shows the results of which eight comparators #0 to #7 are turned on/off in accordance with the levels. In the range of transmission power values of "0" to "2" enclosed with a thick solid line, comparators #0 to #7 are turned off, and current consumption corresponding to this range is reduced. A change in current consumption in this case is shown in FIG. 5(*b*). As is obvious from this figure, a noticeable reduction effect in consumption current is shown in an area where the transmission power calculation value is small. Thus, according to this embodiment, power consumption in the address generator can be reduced.

Second Embodiment

The structure of the distortion compensation address generator and the operation thereof according to the second embodiment will be explained with reference to FIGS. 6 to 10.

The feature of this embodiment lies in the structure in which an address calculator is provided in addition to the address generation table as means for generating an address and both are switched in accordance with the transmission power value, whereby current consumption is reduced even in a higher transmission power area so as to realize higher reduction in power consumption than the previous embodiment.

Figure 6:
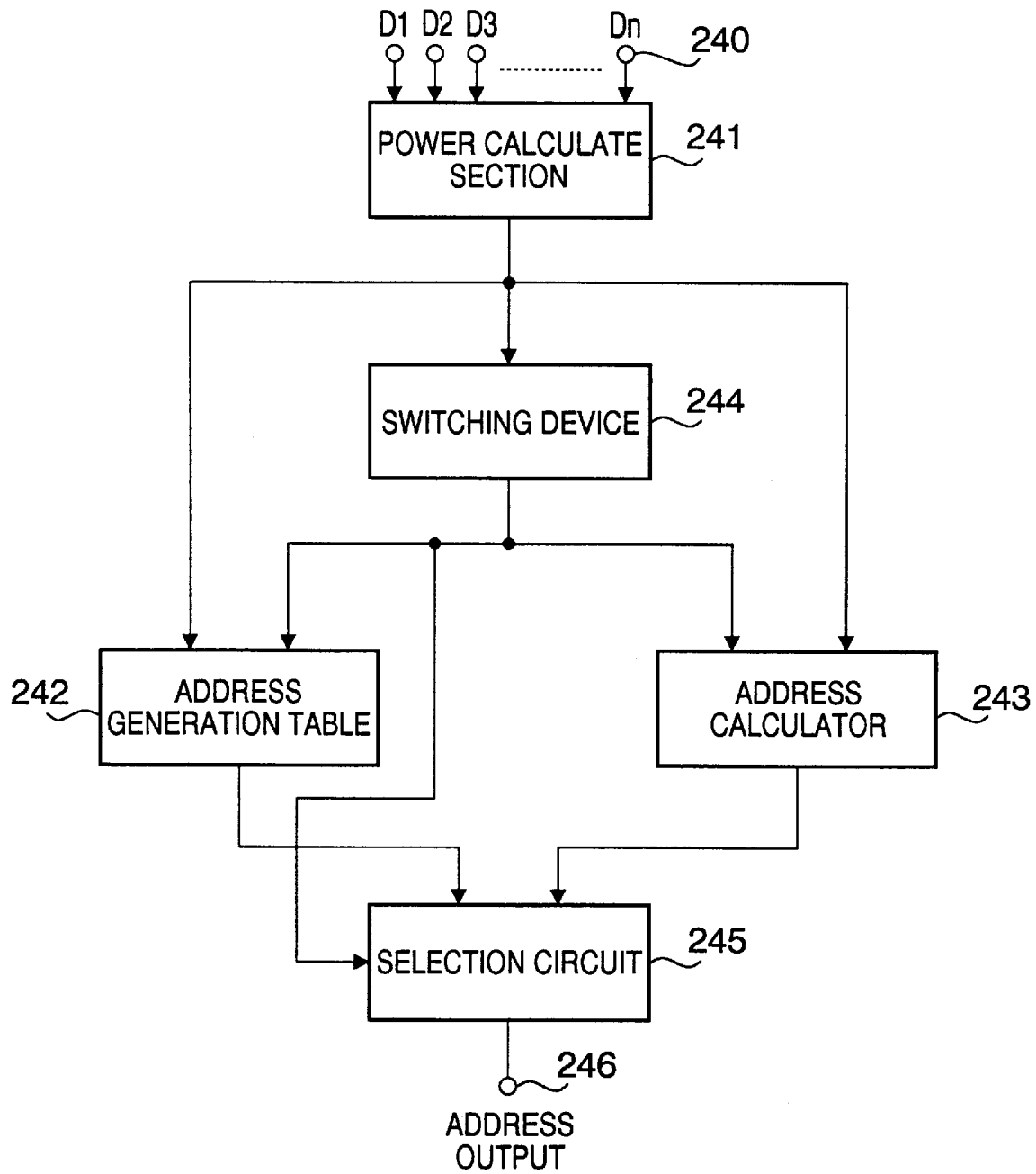
FIG. 6 is a block diagram showing the structure of a distortion compensation address generation table according to a second embodiment of the present invention.

FIG. 6 is a block diagram showing the entire structure of a distortion compensation address generator.

As shown in this figure, the address generator of this embodiment comprises a plurality (1 to n) of transmission data input terminals 240, a power calculate section 241, an address generation table (having comparator control circuit 202 shown in FIG. 3), an address calculator 243, an address generation switching device 244, an output selection circuit 245, and an address output terminal 246.

Figure 7A:
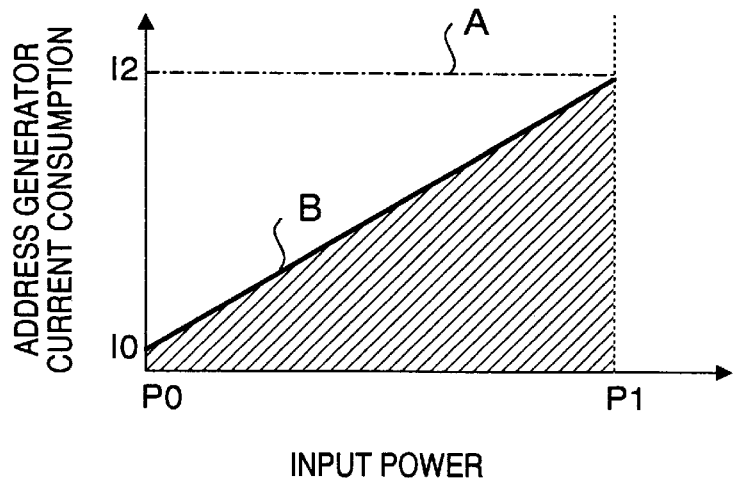
FIG. 7(a) is a view showing current consumption characteristics with respect to input power in the distortion compensation address generation table according to the second embodiment.
Figure 7B:
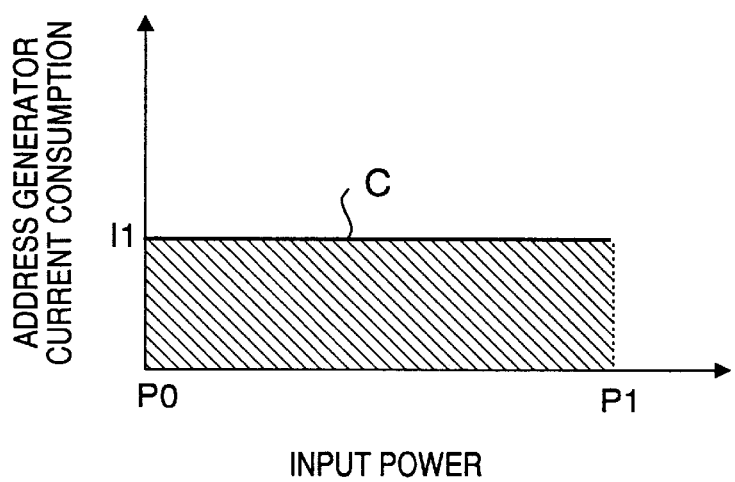
FIG. 7(b) is a view showing current consumption characteristics with respect to input power in a distortion compensation address calculator according to the second embodiment.
Figure 7C:
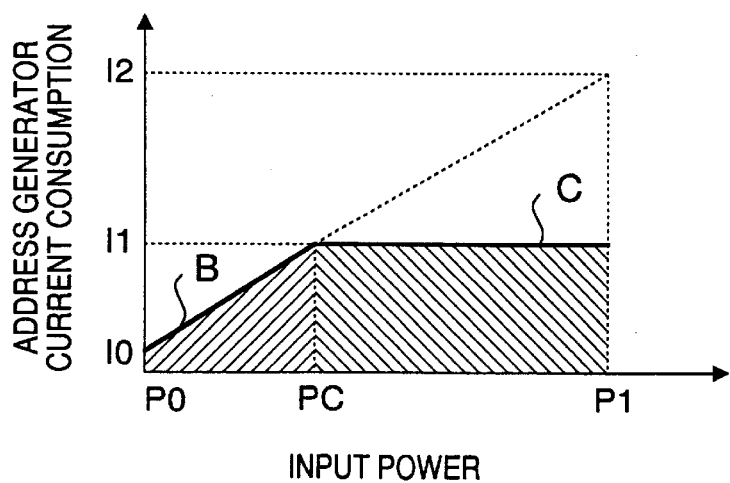
FIG. 7(c) is a view showing current consumption characteristics with respect to input power in a combined distortion compensation address generator according to the second embodiment.

FIGS. 7(*a*) to 7(*c*) are views explaining the principle of reduction in power consumption according to this embodiment.

As explained in the previous embodiment, in the address generation table with a comparator control function (FIG. 3), the effect of reduction in current consumption is brought to the fore in the small input power area as shown in FIG. 7(*a*). In the figure, a characteristic A shows a case of the comparison, and a characteristic B shows a case of the address generation table with a comparator control function.

It should be noted that there is a limitation in reducing current consumption since the number of comparators to be operated is increased when input power increases.

While, in the case of the address calculator, which generates an address at real time without using the comparators by providing a predetermined calculation to a transmission power value to be input, its current consumption is substantially determined by an amount of hardware. For this reason, as shown in FIG. 7(*b*), current consumption is substantially constant (characteristic C) regardless of input power, and no complicated circuit is needed when the content of calculation is a linear operation such as a multiplication, an addition, etc. For this reason, the amount of current consumption is not so increased. In FIG. 7(*b*), current consumption is shown by I1.

Here, as shown in FIG. 7(*c*), an address generation table 242 with a comparator control function is used in a small input power area (characteristic B). Then, when input power exceeds a predetermined threshold value PC, the address calculator 243 is used (characteristic C). This controls an increase in current consumption even in an area where transmission power is high, so that current consumption can be more reduced as a whole in addition to the effect of reduction in current consumption obtained by turning off the comparator in the low power area.

Also, since no address generation table is used in the high transmission power area, unlike the first embodiment, it is unnecessary to prepare the comparators to cover all dynamic ranges of transmission power. Therefore, the number of comparators can be greatly reduced.

Since the structure of the address calculator is not so complicated, there is no case in which the occupation area of the circuit is suddenly increased even if the address calculator is newly added. As a result, the occupation area of the circuit forming the address generator can be reduced, and the apparatus can be downsized.

The above explained the outline of this embodiment. The following will explain the specific operation and structure.

In FIG. 6, transmission data n (1 to n) is input to the power calculate section 241.

The calculation value of transmission power is one that is obtained by squaring each of input transmission data (1 to n) to n and adding all resultant values or providing square root processing to the value of the addition. The calculated transmission power values are input to the address generation table 242 and the address calculator 243 in parallel, respectively.

Also, the transmission power value is input to a switching device 244. The switching device 244 controls to operate either the address generation table 242 or the address calculator 243.

An address generated by the address generation table 242 and an address generated by the address calculator 243 are sent to a selection circuit 245.

The selection circuit 245 selects either the address supplied from the address generation table 242 or the address supplied from the address calculator 243 upon reception of a control signal from the switching device 244, and outputs the selected address to the address output terminal 246.

Next, the specific structure of the switching device 244 will be explained with reference to FIG. 8.

A transmission power value, which is input from an input terminal 250, is input to a comparator 251 provided in the switching device 244.

In a change-over threshold value memory 252, there is stored a transmission power value in a case where current consumption of the address generation table 242 exceeds current consumption of the address calculator 243. The transmission power value and a change-over threshold value 252 are input to the comparator 251, and a comparison result, serving as a change-over signal, is output from an output terminal 253.

Next, the structure of the address calculator 243 will be explained with reference to FIG. 9(a).

A change-over signal is input to a terminal 261 of the address calculator 243 from the switching device 244. The change-over signal functions as a control signal for turning on/off the address calculator 243. While, the transmission power is input to a terminal 260.

In a multiplication coefficient storing section 263, a coefficient a for a multiplier is stored. In an adder coefficient storing section 265, a coefficient β for an addition is stored. In a division coefficient storing section 267, a coefficient γ for a division is stored.

A multiplier 262 multiplies the transmission power value by multiplication coefficient α. A signal showing the result is input to an adder 264, and coefficient P for an addition is added thereto. A signal showing the result is input to a divider 266, and a division using coefficient γ for a division is executed here. A signal showing the result is input to a limiter circuit (LIM) 268, and a dynamic range for an output signal is limited here. Then, an address calculation result is output from an output terminal 269.

Next, the calculation content of the address calculator 243 will be explained with reference to FIGS. 9(b) and 9(c).

FIG. 9(b) shows the relationship between a transmission power value and an output address value. In this embodiment, an address "#ad0" is output when the transmission power value is p0, and an address "#ad2" is output when the transmission power value is p2.

In the address calculator 243, the relationship among coefficients α, β, γ, and a limiter condition of the limiter circuit 268 are shown as in FIG. 9(c).

FIG. 10(a) and FIG. 10(b) are views explaining the result of the reduction effect in current consumption of this embodiment, which has been specifically examined by a computer simulation.

On the assumption that eight levels of "0" to "7" would be set as a transmission power calculation value, FIG. 10(a) shows the results of which eight comparators #0 to #7 are turned on/off in accordance with the levels and the result of "ON" and "OFF" determination of the address calculator 243. In the range of transmission power values of "0" to "2" enclosed with a thick solid line as shown in FIG. 10(a), a part or all comparators #1 to #3 are turned on. Then, when the transmission power value exceeds "3", all comparators are turned off, and the address calculator 243 is turned on instead.

In this case, a change in current consumption is shown in FIG. 10(b). In this figure, a diagonally shaded area, which is enclosed with a characteristic line 270 (a characteristic due to the address generation table with a comparator address calculator) and a characteristic line 272 (a characteristic due to an address calculator), shows current consumption in this embodiment.

As is obvious from this figure, even in an area where the transmission power calculation value is small and an area where transmission power value is large, current consumption can be effectively reduced. Thus, according to this embodiment, reduction in power consumption of the address generator can be improved.

Also, as is obvious from FIG. 10(a), the number of comparators, which are actually operated, is small in the address generation table 242. For this reason, the number of built-in comparators can be reduced, and the occupation area of the circuit can be achieved at the same time.

Third Embodiment

An address generator for compensating non-linear distortion is basically the same as the address generator explained in the second embodiment, and both are different from each other in a point that a division in the address calculator is carried out by use of a bit shift.

Figure 11:
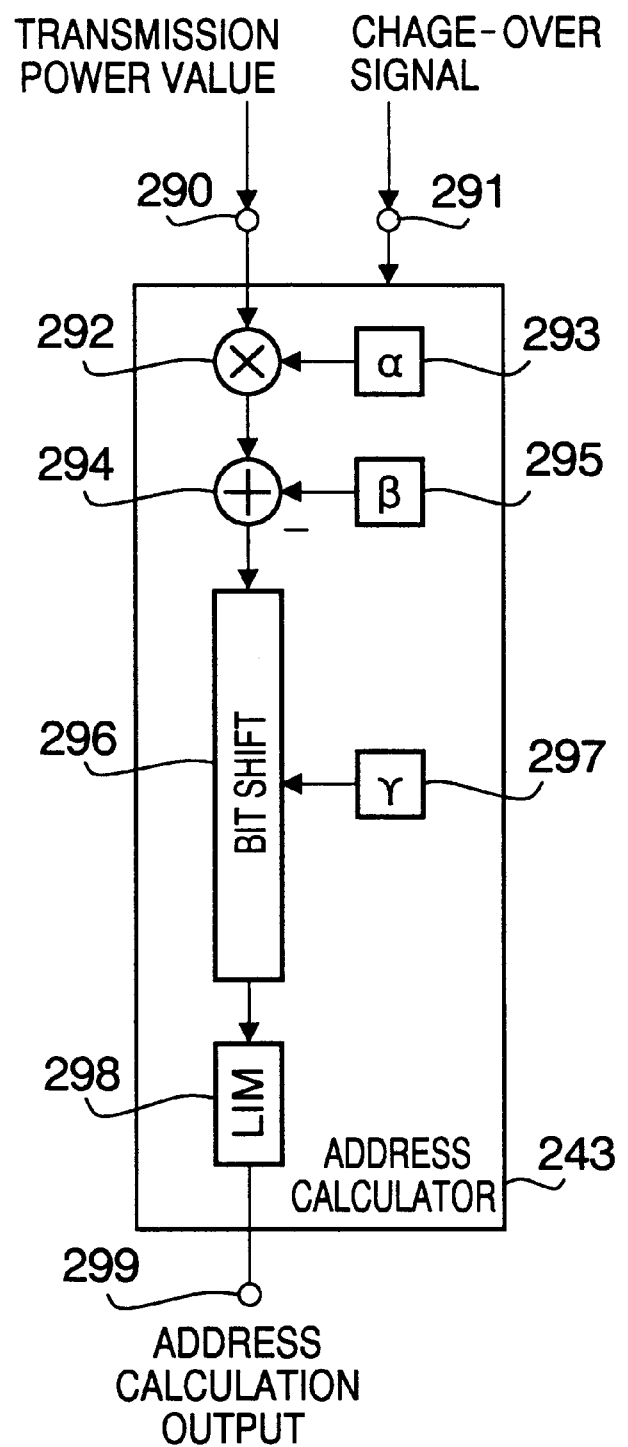
FIG. 11 is a circuit diagram showing a specific structure of an address calculator according to a third embodiment of the present invention.

FIG. 11 is a view showing the structure of the address calculator according to this embodiment. An address calculator 283 comprises signal input terminals 290, 291, a multiplier 292, an adder 294, coefficient storing sections 293, 295, 297, a bit shift circuit (shift register, etc.) 296, a limiter 298, and an address output terminal 299.

Since digital data has a property in which a data value becomes ½ when being shift right by one bit, the it shift circuit 296 easily performs the division through he use of this property.

Since the bit shift circuit 296 is basically structured by the shift register, there is an advantage in which the circuit can be simplified as compared with a case the divider is provided.

Fourth Embodiment

In the previous embodiment, the address for compensating distortion was only generated to follow transmission power, which instantaneously varied in accordance with the size of transmission data. In contrast, according to this embodiment, an address for compensating distortion is generated in real time to follow a control value of transmission power control when the transmission power control is carried out for the purpose of reducing co-channel interference and power consumption of the mobile apparatus in a mobile communication system.

If transmission power control is carried out in the range of e.g., "−6 dB" to "+24 dB" by unit of 1 dB, transmission power control of 31 levels in all is performed. Therefore, according to this embodiment, the address generation table and the calculation coefficient or an address calculator are prepared for each level. It should be noted that the basic structure is the same as the case of FIG. 6.

Figure 12:
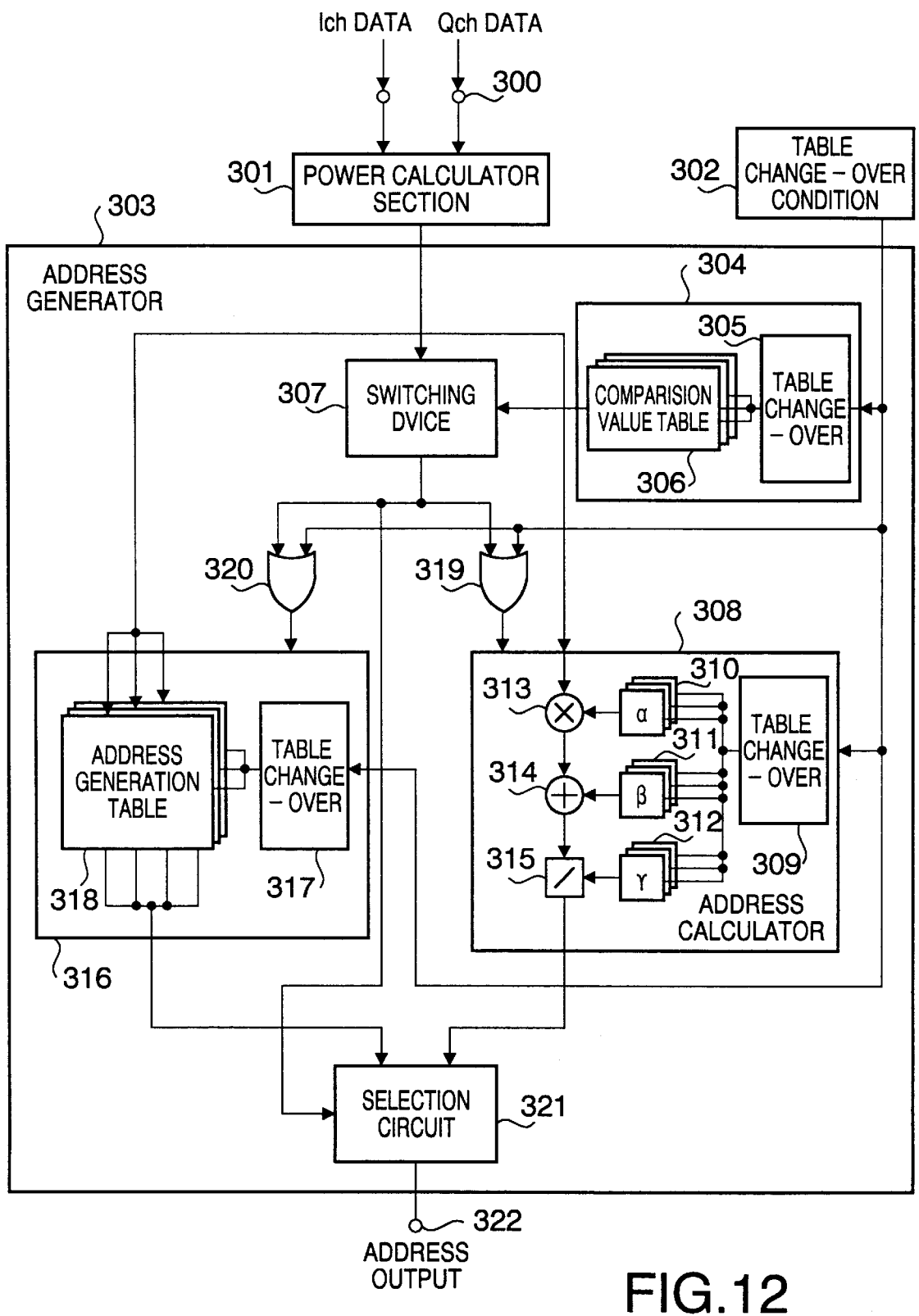
FIG. 12 is a circuit diagram showing the structure of a distortion compensation address generator according to a fourth embodiment of the present invention.
Figure 13:
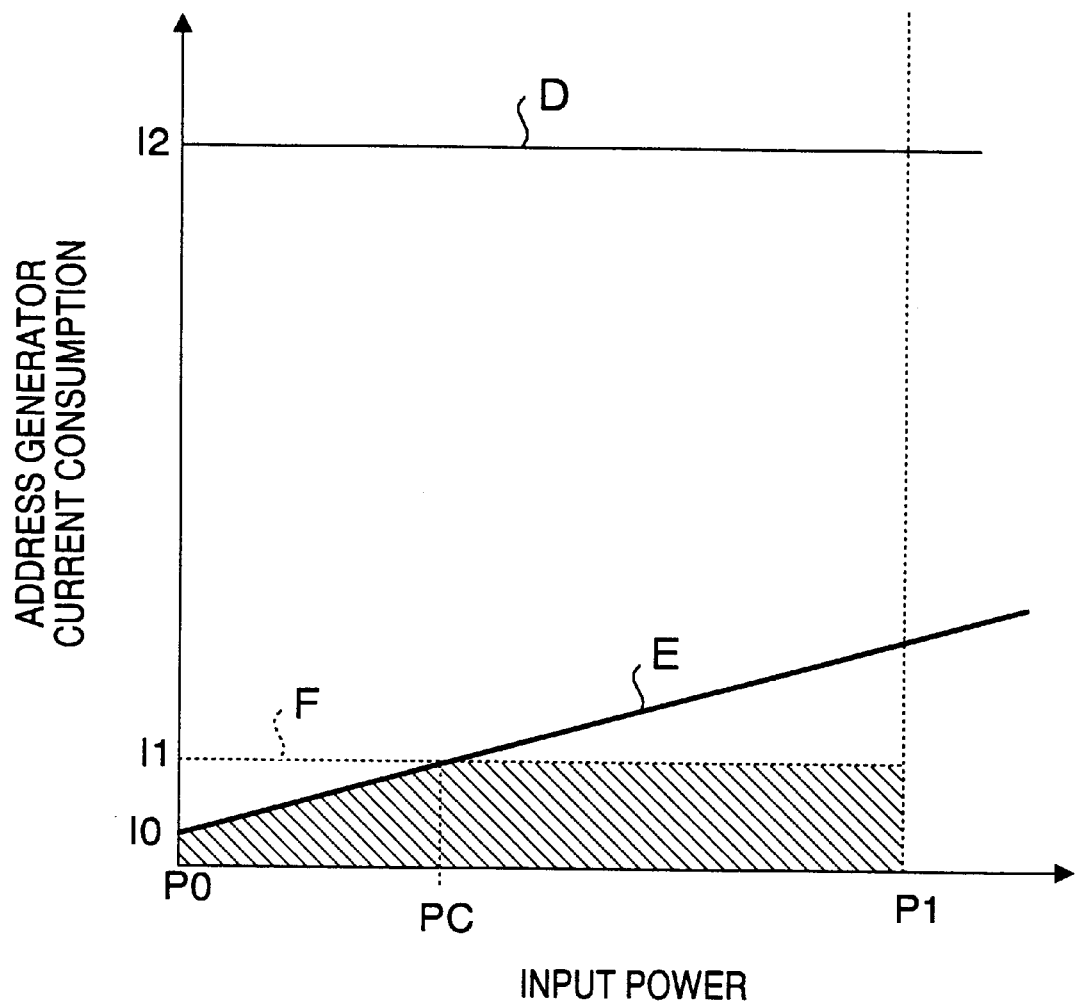
FIG. 13 is a view showing current consumption characteristics with respect to input power of the distortion compensation address generator according to the fourth embodiment.

The following will specifically explain the structure of the address generator and the operation thereof according to this embodiment with reference to FIGS. 12 and 13.

FIG. 12 is a circuit diagram showing the structure of the address generator for compensating non-linear distortion according to this embodiment.

In FIG. 12, one characteristic structure is that an address generation table 318 is provided in address generation table means 316 in accordance with each level (each gradation) of transmission power control and one of address generation tables is selected by a table change-over interface 317. The other characteristic structure is that a plurality of pairs of calculation coefficients ($\alpha$, $\beta$, $\gamma$, etc.) are stored in coefficient storing sections 310 to 312 of an address calculator 308 and a pair of calculation coefficients (for example, $\alpha$, $\beta$, $\gamma$) to be used is selected by a table change-over interface 309.

Also, the other characteristic structure is that there is provided a table change-over condition designating section 302 for outputting a control signal showing a table change-over condition based on a transmission power control value.

More detailed explanation will be given as follows:

When transmission data (Ich, Qch) are input, a power calculate section 301 performs the calculation of the transmission power value. At this time, the calculation value of transmission power is one that is obtained by squaring each of input transmission data Ich and Qch and adding all resultant values or providing square root processing to the value of the addition.

The table change-over condition designating section 302 stores a set value for transmission power control of a transmitting amplifier and outputs a control signal for performing a table change-over based on the set value. The control signal is input to an address generation change-over condition table 304, address generation table means 316, and the address calculator 308. These circuits have table change-over interfaces 305, 317, 309, respectively, and each of these table change-over interfaces 305, 317, 309 selects the table corresponding to the control level of transmission power and the coefficient, that is, the table and coefficient to be actually used.

The address generation change-over condition table 304 has the table change-over interface 305 and a plurality of comparison value tables 306.

The comparison value tables 306 store change values, which are necessary for determining on whether address generation table means 316 or the address calculator 308 is used in a selector 307.

The selector 307 determines on whether address generation table means 316 or the address calculator 308 is used based on the transmission power calculation value, and outputs a change signal.

The change signal output from the selector 307 and the control signal output from the table change-over condition designating section 302 are input to address generation table means 316 and the address calculator 308 through OR gates 320 and 319, respectively. By these signals, either address generation table means 316 or the address calculator 308 is turned on.

In a case where address generation table means 316 is turned on, the transmission power calculation value is input to an address generation table 318 (table selected in accordance with a transmission power level), and an address for compensating distortion is output as a comparison result by the comparator and a decoding result of the decoder as previously explained.

In a case where the address calculator 308 is turned on, as previously explained, calculations are carried out by a multiplier 313, an adder 314, and a divider 315 using a pair of calculation coefficients $\alpha$, $\beta$, $\gamma$ (a pair of coefficients selected in accordance with the transmission power level) stored in the coefficient storing sections 310 to 312, and the address for compensating distortion is output as the calculation result. The address for compensating distortion is output from an output terminal 322 through an output selection circuit 321.

Next, reduction effect of output consumption according to this embodiment will be explained with reference to FIG. 13.

As mentioned above, if transmission power control is carried out in the range of e.g., "−6 dB" to "+24 dB" by unit of 1 dB, transmission power control of 31 gradations (levels) in all is performed. Therefore, according to this embodiment, the address generation table and the calculation coefficient for an address calculator must be prepared for each gradation.

If 10 comparators are used in one address generation table, the total number of comparators is 310 (31×10).

If a system, which generates an address for compensating distortion using only the address generation tables, is used and all address generation tables are operated in parallel, a considerably large current "I2" is always consumed regardless of input power as shown by a characteristic line D of FIG. 13.

However, as in this embodiment, the address generation table to be used is changed as required so that only the necessary address generation table is operated and only the necessary comparators built in the selected address are operated. As a result, current consumption in the address generation table is greatly reduced as shown in a characteristic line E of FIG. 13.

While, in a case where an address is generated using the address calculator by a real time calculation, current consumption is substantially determined by an amount of hardware, so that current consumption is substantially constant (I1) as shown in a characteristic line F (illustrated in a dot-dash line) of FIG. 13.

According to the present invention, when input power is below a threshold value (PC), the address generation using the address generation table is carried out. When input power exceeds the threshold value (PC), the address generation using the address calculator is carried out. As a result, a current consumption characteristic (the diagonally shaded area in the figure) in which characteristic lines E and F of FIG. 13 are combined is realized. This drastically reduces the total amount of current consumption.

The reduction effect in current consumption according to this embodiment becomes more pronounces as the dynamic range of transmission power control is large and the level of the address to be output is finely set, so that a large effect can be obtained.

Also, according to this embodiment, the number of comparators to be built in one address generation table can be reduced, and the reduction effect can be obtained by being amplified by the number of levels (the number of gradations) of the transmission power control. While, the structure of the address calculator is simple. Therefore, according to this embodiment, the occupation area of the circuit is conspicuously reduced, and miniaturization of the apparatus can be improved.

Fifth Embodiment

An address generator for compensating non-linear distortion is basically the same as the address generator explained in the fourth embodiment, and both are different from each other in a point that a division in the address calculator is carried out by use of a bit shift.

Figure 14:
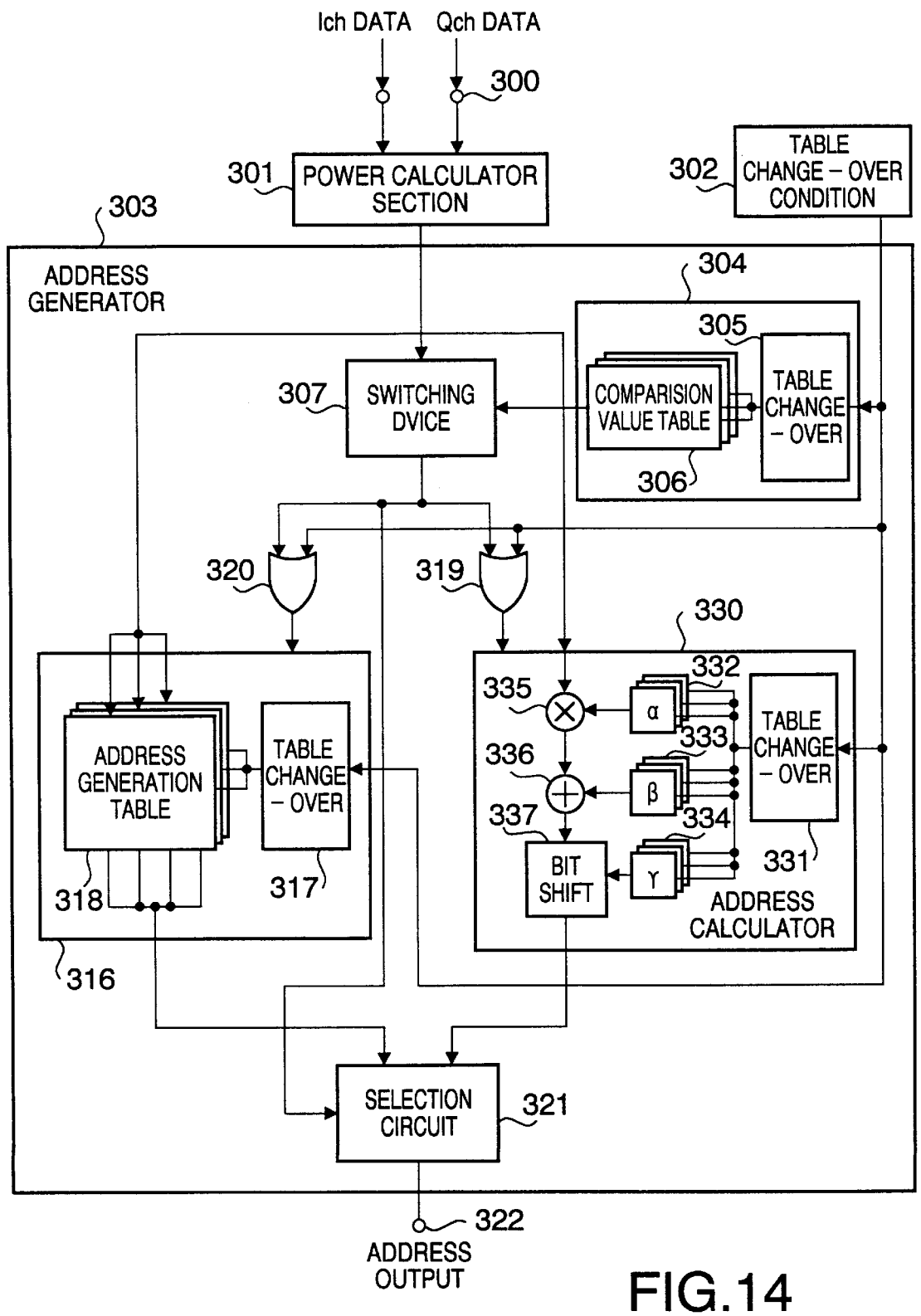
FIG. 14 is a block diagram showing the structure of the distortion compensation address generator according to a fifth embodiment of the present invention.

FIG. 14 is a view showing the structure of the address generator for compensating non-linear distortion according to this embodiment. In FIG. 14, the point different from FIG. 13 is only the structure of an address calculator 330, and the other points are the same as the case of FIG. 13. Therefore, the same reference numerals as used in FIG. 13 are added to common portions.

In FIG. 14, the address calculator 330 comprises a table change-over interface 331, calculation coefficient storing sections 332, 333, 334, a multiplier 335, an adder 336, and a bit shift circuit (shift register) 337. Since digital data has a property in which a data value becomes ½ when being shift right by one bit, the bit shift circuit 337 easily performs the division through the use of this property.

Since the bit shift circuit 337 is basically structured by the shift register and the structure is extremely simple, there is an advantage in which the circuit can be simplified as compared with a case the divider is provided.

Sixth Embodiment

FIG. 15 is a view showing the structure of a transmitter of a CDMA system using the address generator for compensating distortion according to the present invention. In the figure, a portion closed with a dash-single-dot line is an address generator 403 for compensating distortion.

The following will explain the entire structure and the operation.

A CODEC section 400 provides coding processing and transmission format forming processing to a transmitting signal. An output signal of CODEC section 400 is input to a CDMA section 401, and spread modulation processing using a spread code is provided here.

Next, a transmission band limiting section 402 wave-shapes the spread-modulated signal and provides band limitation processing thereto.

A transmission power calculate section 404 provided in the address generator 403 squares the signals band-limited by the band limiter 402. Then, the transmission power calculate section 404 transmits a value, which is obtained by adding all resultant values or providing square root processing to the value of the addition, to an address generation section 409.

A transmission power designating signal 407 output from a transmission power designating section 406 is input to a transmitting amplifier 418 and a table change-over determination section 405.

The table change-over determination section 405 transmits a control signal for designating an address generation table, which is suitable for transmission power, to an address generation section 409.

An address signal 410 generated from the address generation section 409 is input to a compensation data storing section 414, with the result that compensation data 415 is output. Compensation data is input to a compensation data multiply section 413.

On the other hand, a delay device 412 has a function in which transmission is maintained and delayed by processing time required in the address generation section.

An output of the delay device 412 is input to the compensation data multiply section 413. Then, complex multiplication processing using compensation data 415 sent from the compensation data storing section 414 is carried out. It should be noted that the control signal 410 to be sent to the compensation data storing section 414 from the address generation section 409 becomes active when the condition, which is shown by the output signal of the table change-over determination section 405, exceeds an normal operation range of the address generation section 409.

When the control signal 410 becomes active, the compensation data storing section 414 maintains a signal component, which has been output just before the control signal 410 becomes active, and stops the operation internally. The stop of operation cuts current consumed by the compensation data storing section 414 and contributes to reduction in power consumption.

Also, a D/A converter 416 converts transmitting data complex multiplied by the compensation data multiply section 413 to an analog signal. An output signal of the D/A converter 416 is subjected to quadrature modulation processing by a quadrature modulation section 417 and sent to a transmitting amplifier 418. An output amplified by the transmitting amplifier 418 is transmitted through an antenna 419.

In the above-structured transmitter, communication quality is good, power consumption is reduced, and its size is small.

Seventh Embodiment

Figure 16:
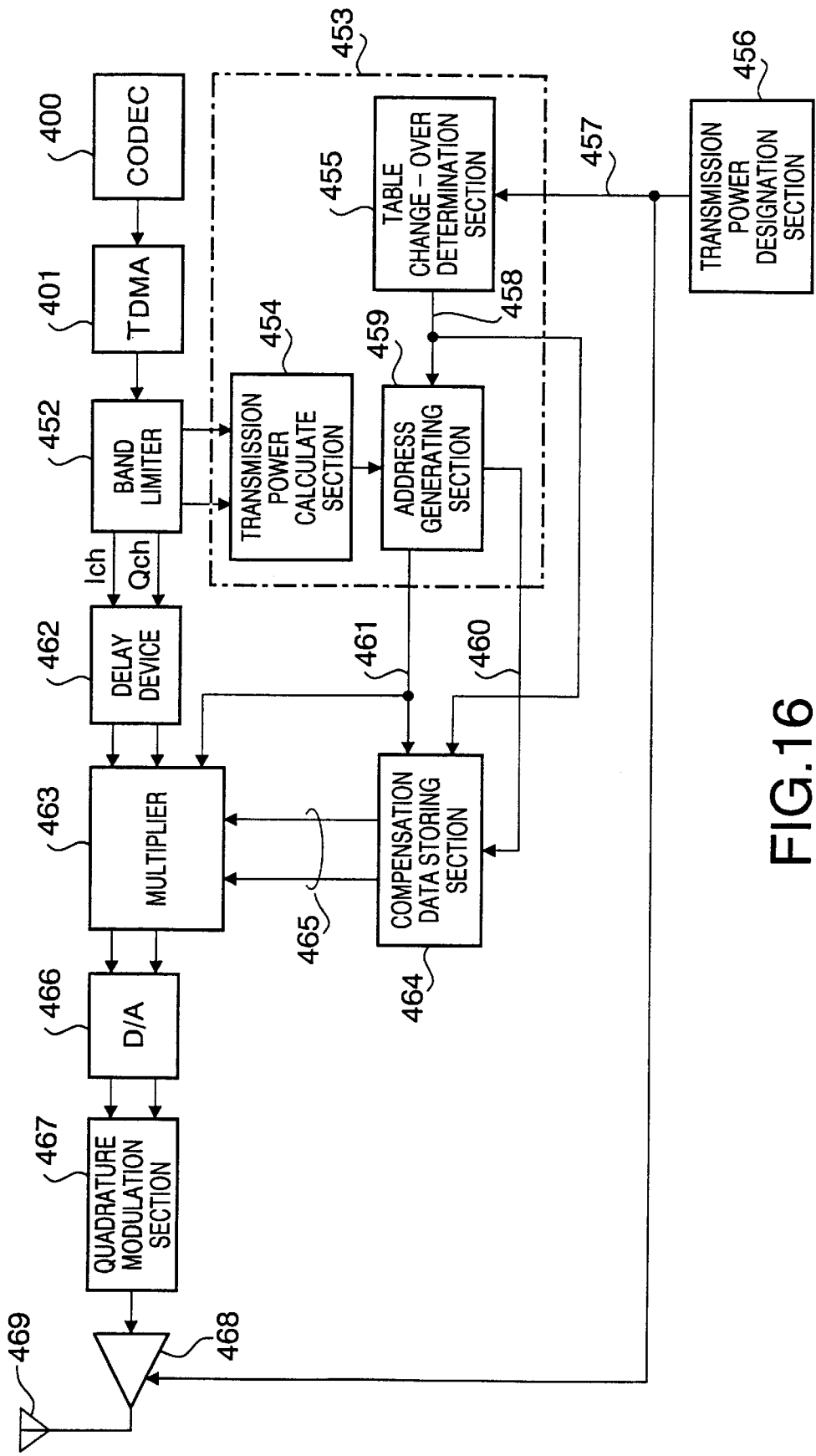
FIG. 16 is a block diagram showing the structure of a transmitter of a TDMA system according to a seventh embodiment of the present invention.
Figure 17A:
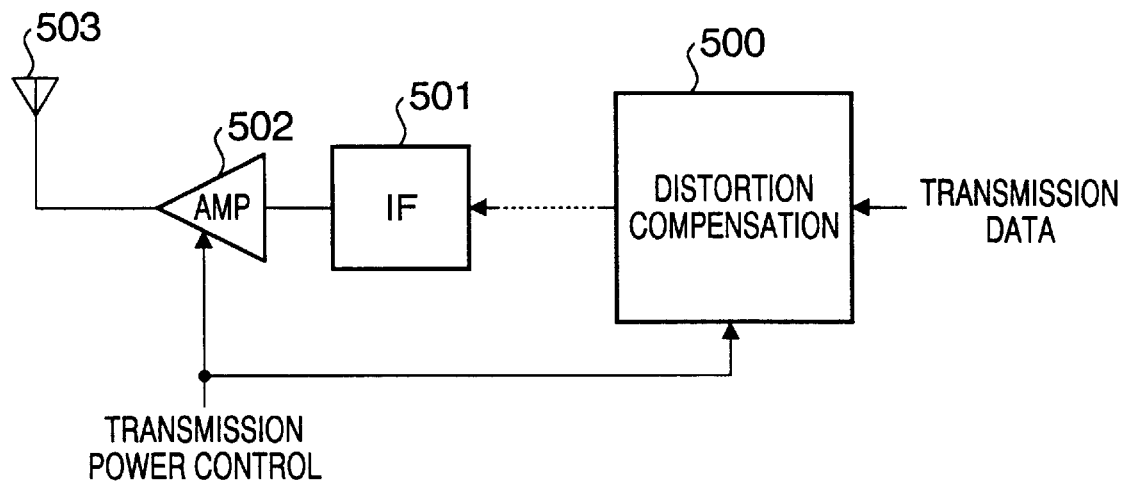
FIG. 17(a) is a circuit diagram showing an example of the structure of the main parts of the transmitter.
Figure 17B:
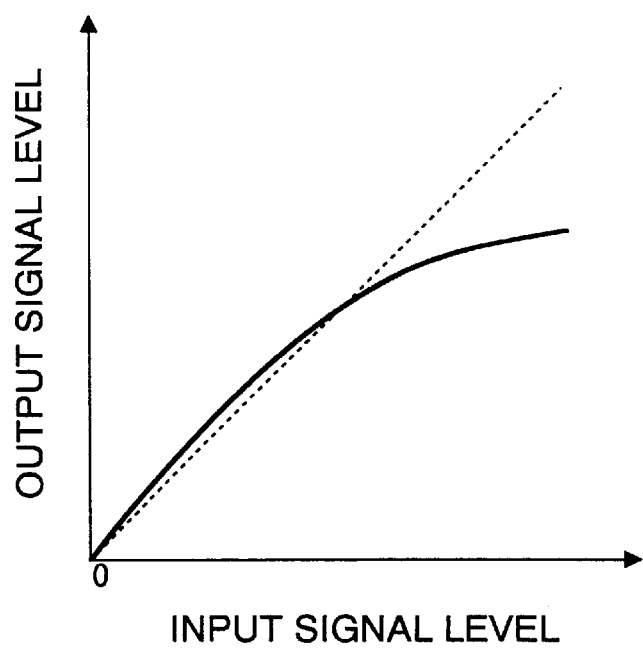
FIG. 17(b) is a characteristic view for explaining a non-linear distortion of a transmitting amplifier.

FIG. 16 is a view showing the structure of a transmitter of a TDMA system using the address generator for compensating distortion according to the present invention. In the figure, a portion enclosed with a dash-single-dot line (reference numeral 453) is the distortion compensation address generator according to the present invention.

The following will explain the entire structure and the operation.

In FIG. 16, data to which coding processing is provided by a CODEC section 450 is input to a TDMA section 451 so as to be reconstructed to a transmission format of TDMA.

A transmission band limiting section 452 wave-shapes a spread-modulated signal and provides a predetermined band limitation thereto.

A transmission power calculate section 454 provided in an address generator 453 squares two output signals of the band limiter 452. Then, the transmission power calculate section 454 outputs a value, which is obtained by adding all resultant values or providing square root processing to the value of the addition, to be transmitted to an address generation section 459.

A transmission power designating signal 457 output from a transmission power designating section 456 is input to a transmitting amplifier 468 and a table change-over determination section 455. The table change-over determination section 455 generates a signal 458 for controlling the address generation table of an address generation section 459 and the operation of the address calculator, and transmits the signal.

A predetermined address for a compensation data storing section 464 is designated by an address signal 461 output from the address generation section 459, and compensation data 465 stored at the designated address is transmitted to a compensation data multiply section 463.

It should be noted that a control signal 460 output from the address generation section 464 is a signal for controlling ON/Off of the circuit of the compensation data storing section 464. The control signal 460 becomes active when the condition, which is shown by the output signal of the table change-over determination section 455, exceeds an normal operation range of the address generation section 459. When the control signal becomes active, the compensation data storing section 464 maintains a signal component, which has been output just before the control signal 460 becomes active, and stops the operation internally. The stop of operation can prevent waste power consumption.

A delay device 462 has a function in which transmission is maintained by processing time required in the address generation section 459.

An output of the delay device 462 is input to the compensation data multiply section 463. Then, complex multiplication processing is carried out using compensation data 465.

A D/A converter 466 converts transmitting data complex multiplied by the compensation data multiply section 463 to an analog signal.

An output signal of the D/A converter 466 is subjected to quadrature modulation processing by quadrature modulation section 467 and amplified by a transmitting amplifier 468, and transmitted through an antenna 469.

In the above-structured transmitter, communication quality is good, power consumption is reduced, and its size is small.

As explained above, according to the present invention, in a circuit for compensating an instantaneous variation in the transmission power value, control such that a minimum current consumption can be attained is always carried out. Also, at the time of compensating for a variation in the control value of transmission power control of the transmitting amplifier, circuit can be controlled such that a minimum current consumption can be attained is always carried out.

Therefore, power consumption in the distortion compensation address generating circuit can be largely reduced. For this reason, a transmission distortion compensation circuit with a small size and low power consumption can be realized. Also, the circuit of the present invention is suitable for an IC implementation for the reason of low power consumption. Moreover, this contributes to the miniaturization of the communication apparatus and the use for a long time.

The present invention is not limited to the above described embodiments, and various variations and modifications may be possible without departing from the scope of the present invention.

This application is based on the Japanese Patent Application No. HEI10-197719 filed on Jul. 13, 1998, entire content of which is expressly incorporated by reference herein.

What is claimed is:

1. A distortion compensation address generator for generating an address designating a storage area of compensation data for compensating non-linear distortion of a transmitting amplifier comprising:

a plurality of comparators each for comparing a transmission power value with a respective predetermined reference value;

a decoder for decoding an output of each of said plurality of comparators; and comparator control means for turning off a part of said plurality of comparators being not used in generation of said address, corresponding to a level of said transmission power value.

2. The distortion compensation address generator according to claim 1, wherein said comparator control means compares transmission power value with an operation area coefficient prepared in advance in order to generates a control signal for turning off the part of said comparators.

3. The distortion compensation address generator according to claim 1, further comprising transmission power calculation means for calculating said transmission power value based on transmission data.

4. The distortion compensation address generator according to claim 3, wherein said transmission power calculation means combines a plurality of transmission signals so as to calculate transmission power.

5. A distortion compensation address generator for generating an address designating a storage area of compensation data for compensating non-linear distortion of a transmitting amplifier comprising:

an address generation table having a plurality of comparators each for comparing a transmission power value with a respective predetermined reference value; a decoder for decoding an output of each of said plurality of comparators; and comparator control means for turning off a part of said plurality of comparators being not used in generation of said address, corresponding to a level of said transmission power value;

an address calculator for providing a predetermined calculation to said transmission power value so as to generate said address; and a switching circuit compares said transmission power value with a predetermined threshold value in order to turn on either said address generation table or said address calculator in accordance with a comparison result.

6. The distortion compensation address generator according to claim 5, wherein said switching circuit turns on said address generation table when said transmission power value is smaller than said threshold value and turns on said address calculator when said transmission power is greater than said threshold value.

7. The distortion compensation address generator according to claim 5, wherein said address calculator has a function of executing an addition, a multiplication, and a division.

8. The distortion compensation address generator according to claim 7, wherein said address calculator performs the division by a bit shift operation.

9. The distortion compensation address generator according to claim 5, further comprising transmission power calculation means for calculating said transmission power value based on transmission data.

10. The distortion compensation address generator according to claim 9, wherein said transmission power calculation means combines a plurality of transmission signals so as to calculate transmission power.

11. A distortion compensation address generator for generating an address designating a storage area of compensation data for compensating non-linear distortion of a transmitting amplifier comprising:

transmission power calculation means for calculating transmission power of a transmitting signal;

a plurality of address generation tables, to each of which a transmission power value calculated by said transmission power calculation means is inputted, being selectively switched;

an address calculator with a plurality of calculation coefficient tables, for executing with respect to the transmission power value of the transmitting signal a predetermined calculation using coefficient values of one pair of the calculation coefficient tables selected from said plurality of calculation coefficient tables, thereby allowing rating said address to be generated;

table selecting means for selecting one address generation table from said plurality of address generation tables and one pair of calculation coefficient tables from said plurality of calculation coefficient tables, corresponding to a transmission power level of said transmitting amplifier; and a switching circuit for comparing said transmission power value with a predetermined threshold value to turn on either said address generation table or said address calculator, corresponding to a comparison result, wherein each of said plurality of address generation table has a plurality of comparators for comparing said transmission power value with a predetermined reference value; a decoder for decoding an output of each of said plurality of comparators; and comparator control means for turning off a part of said plurality of comparators being not used in generation of said address, corresponding to a level of said transmission power value.

12. The distortion compensation address generator according to claim 11, wherein said transmission power calculation means combines a plurality of transmission signals so as to calculate transmission power.

13. The distortion compensation address generator according to claim 11, wherein said switching circuit turns on said address generation table when said transmission power value is smaller than a threshold value and turns on said address calculator when said transmission power value is greater than said threshold value.

14. The distortion compensation address generator according to claim 11, wherein said address calculator has a function of executing an addition, a multiplication, and a division.

15. The distortion compensation address generator according to claim 14, wherein said address calculator performs the division by a bit shift operation.

16. A distortion compensation circuit comprising:

a distortion compensation address generator described in claim 1;

distortion compensation data storage means to which an address signal outputted from said distortion compensation address generator is inputted so as to output corresponding distortion compensation data; and a compensating circuit for compensating distortion of a transmitting signal using said distortion compensation data outputted from said distortion compensation data storage means.

17. A transmitter comprising:

a spread processing section for performing spectrum spread by multiplying data to be transmitted by a specific code;

a distortion compensation address generator having a plurality of comparators each for comparing a transmission power value with a respective predetermined reference value; a decoder for decoding an output of each of said plurality of comparators; and comparator control means for turning off a part of said plurality of comparators being not used in generation of said address corresponding to a level of said transmission power value;

distortion compensation data storage means to which an address signal outputted from said distortion compensation address generator is inputted so as to output corresponding distortion compensation data;

a compensating circuit for compensating for distortion of data passed through said spread processing section using said distortion compensation data outputted from said distortion compensation data storing means;

a transmitting amplifier for amplifying a transmitting signal obtained based on data output from said compensating circuit; and an antenna for outputting an output of said transmitting amplifier as a radio signal.

18. The transmitter according to claim 17, further comprising transmission power designating means for designating transmission power with respect to said transmitting amplifier and said distortion compensation address generator.

19. A transmitter comprising:

a time division multiplex processing section for performing time division multiplex processing;

a distortion compensation address generator having a plurality of comparators each for comparing a transmission power value with a respective predetermined reference value; a decoder for decoding an output of each of said plurality of comparators; and comparator control means for turning off a part of said plurality of comparators being not used in generation of said address, corresponding to a level of said transmission power value;

distortion compensation data storage means to which an address signal outputted from said distortion compensation address generator is inputted so as to output corresponding distortion compensation data;

a compensating circuit for compensating distortion of data passed through said time division multiplex processing section using said distortion compensation data outputted from said distortion compensation data storing means;

a transmitting amplifier for amplifying a transmitting signal obtained based on data outputted from said compensating circuit; and an antenna for outputting an output of said transmitting amplifier as a radio signal.

20. The transmitter according to claim 19, further comprising transmission power designating means for designating transmission power to said transmitting amplifier and said distortion compensation address generator.

21. A mobile station apparatus including the transmitter described in claim 17.

22. A base station apparatus including the transmitter described in any one of claims 17 to 20.

* * * * *

UNITED STATES PATENT AND TRADEMARK OFFICE
CERTIFICATE OF CORRECTION

PATENT NO.    : 6,272,326 B1
DATED         : August 7, 2001
INVENTOR(S)   : H. Shinde It is certified that error appears in the above-identified patent and that said Letters Patent is hereby corrected as shown below:

<u>Column 20,</u>
Line 61, "any one of claims 17 to 20" should be -- claim 17 --.

Signed and Sealed this

Second Day of April, 2002

Attest:

JAMES E. ROGAN
*Attesting Officer*  *Director of the United States Patent and Trademark Office*